United States Patent

Eckel

Patent Number: 6,095,304
Date of Patent: Aug. 1, 2000

[54] CLUTCH ASSEMBLY WITH ACTUATION DEVICE SUPPORTED BY DAMPER

[75] Inventor: Hans-Gerd Eckel, Laudenbach, Germany

[73] Assignee: Firma Carl Freudenberg, Weinheim, Germany

[21] Appl. No.: 09/134,840

[22] Filed: Aug. 17, 1998

[51] Int. Cl.[7] .............................. F16D 3/14; F16D 13/40
[52] U.S. Cl. .................. 192/70.17; 192/30 V; 192/70.3; 74/574
[58] Field of Search ................................ 192/89.2, 89.22, 192/109 A, 109 B, 70.27, 70.29, 70.3, 70.17, 30 V; 74/574

[56] References Cited

U.S. PATENT DOCUMENTS

| | | | |
|---|---|---|---|
| 4,210,233 | 7/1980 | Courbot | 192/70.27 X |
| 5,129,499 | 7/1992 | Killian et al. | 192/30 V X |
| 5,135,089 | 8/1992 | Kovac | 74/574 X |

FOREIGN PATENT DOCUMENTS

| | | | |
|---|---|---|---|
| 2616-184 | 12/1988 | France | 192/30 V |
| 3623-627 | 1/1988 | Germany | 192/30 V |
| 0201930 | 9/1986 | Japan | 192/30 V |
| 598811 | 2/1948 | United Kingdom. | |

*Primary Examiner*—Charles A. Marmor
*Assistant Examiner*—Ankur Parekh
*Attorney, Agent, or Firm*—Kenyon & Kenyon

[57] ABSTRACT

A clutch of a periodically-activated prime mover or driven machine having an integrated speed-adaptive damper. The damper is mounted directly on a connected flywheel, and a clutch plate and a pressure plate are arranged between the flywheel and the damper. The damper, in the area of its inner circumference, has a support for a clutch-actuation device, and the clutch-actuation device has a force-originating lever part and a spring part independent of the force-originating lever part.

5 Claims, 2 Drawing Sheets

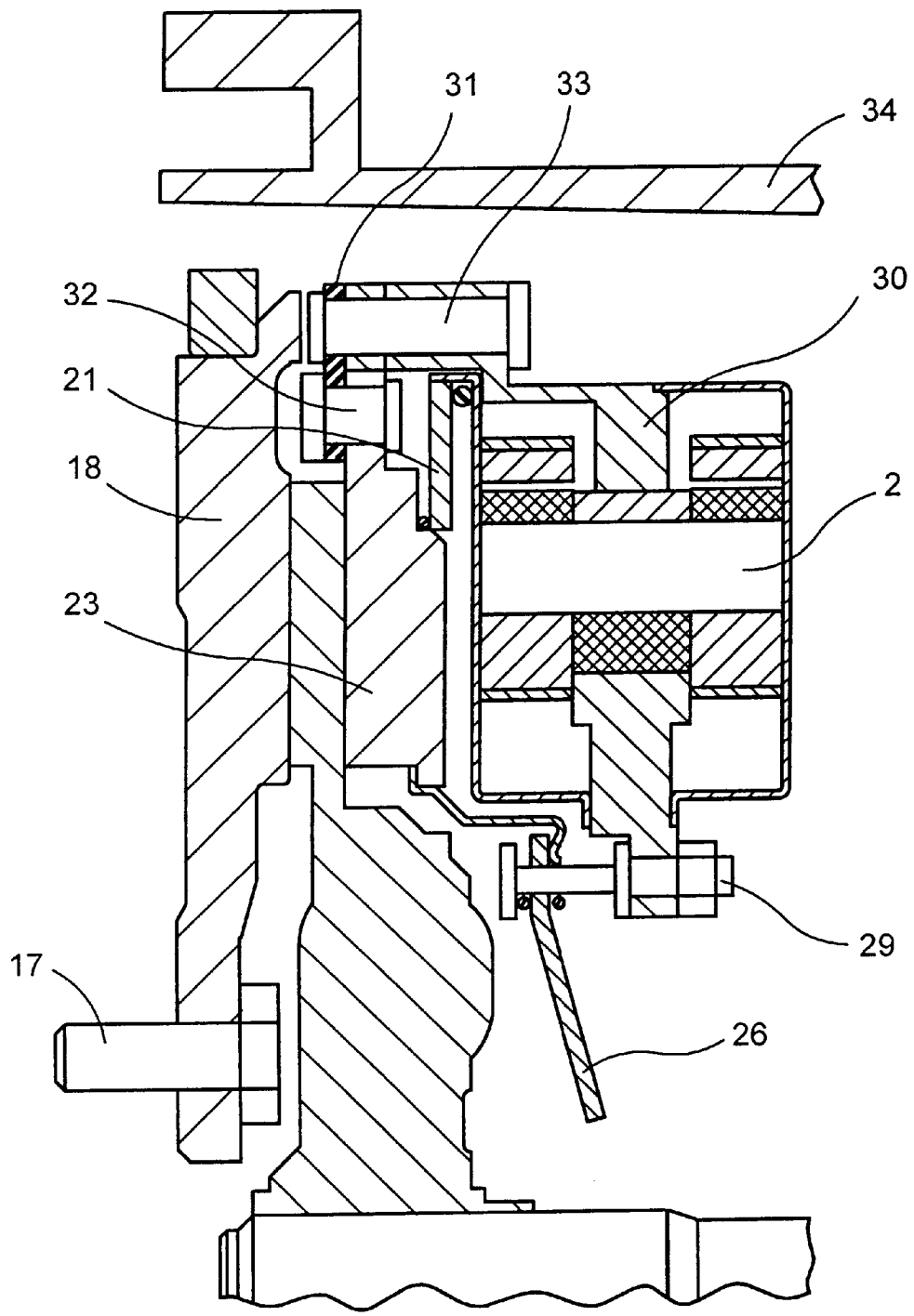
F I G. 2

CLUTCH ASSEMBLY WITH ACTUATION DEVICE SUPPORTED BY DAMPER

BACKGROUND OF THE INVENTION

1. Field of the Invention

The present invention relates to a clutch used with a periodically-activated prime mover or a driven machine, with a speed-adaptive damper or dynamic-vibration absorber.

2. Description of the Related Art

British Patent 598 811 shows a crankshaft with a damper. In that patent, however, no information is given as to the location on the crankshaft where the damper should be mounted.

It is known to attach a damper on the input shaft of a gear unit interacting with a crankshaft by way of a clutch, to damp the vibrations produced by the periodically-activated prime mover or driven machine.

SUMMARY OF THE INVENTION

The object underlying the present invention is to refine a conventional clutch in such a way that the vibrations stemming from the periodically-activated prime mover or driven machine can be damped, using a space-saving design and taking into account the available installation dimensions to the greatest extent possible.

According to the present invention, the damper is mounted on a flywheel. A clutch plate and a pressure plate are arranged between the flywheel and the damper. The damper, in the area of its inner circumference, has a support for a clutch engaging and disengaging device, the clutch engaging and disengaging device being composed of a force-originating lever part and a spring part independent of the force-originating lever part.

The arrangement of the damper and the clutch actuator of the present invention permits a space-saving construction, since the clutch is sandwiched between the flywheel and the damper, which damper is connected to the flywheel. The damper is provided with a support for the clutch lever part. With conventional clutches, the clutch cover, in addition to transferring torque, must also absorb the reaction forces at the lever-part support. The present invention results in the elimination, or reduction in size, of the clutch cover and in a reduction of its wall thickness, since only torque must be transferred by the clutch cover. Furthermore, the present invention has the advantage that, by arranging the clutch and the damper on the flywheel, the normally-required rotating mass of the prime mover or driven machine can be reduced. This is particularly advantageous in cases where, as in the automobile industry, reductions in mass are constantly being sought.

Because of the design of the clutch of the present invention, it is furthermore often possible to reduce, or design more simply, the conventional torsion springs which are mounted between the engine and the gear unit for the compensation of torsional vibrations. The drive train runs with sufficient smoothness as a result of the integration, according to the present invention, of the speed-adaptive damper with the clutch. As a result, torsion springs can be optimized from the point of view of driving dynamics.

By configuring the force-originating lever part and the support toward the axis of rotation, and configuring the spring part in the area of the larger periphery of the pressure plate, it is possible to retain the known force-originating lever part for actuating the clutch, and, at the same time, to keep the external dimensions of the spring part small by the shift to a large periphery, i.e., to a large functional surface for the spring energy.

Furthermore, a clutch cover can be arranged between the flywheel and the damper hub. The pressure plate is then supported by this clutch cover in a generally known manner.

The clutch can be provided with a clutch cover having protuberances, which are designed as centering aids for the damper hub and/or the flywheel. The clutch cover is preferably made of sheet metal and the protuberances are bent segments of the inner periphery of the clutch cover, which are bent, first, toward the flywheel, and, second, toward the damper hub. These protuberances can be calibrated independently of each other, and they ensure a precise alignment of the damper hub with respect to the flywheel, the damper hub and flywheel each being provided with corresponding centering surfaces. In this way, further centering aids such as alignment pins can be dispensed with during assembly of the flywheel with the damper hub, and a screw or bolt connection is made without difficulty.

BRIEF DESCRIPTION OF THE DRAWINGS

The subject matter of the invention is further clarified on the basis of the drawings. The drawings depict:

FIG. 2 is a cross-section of a clutch having a damper without a clutch cover.

DETAILED DESCRIPTION OF THE INVENTION

Figure 1:
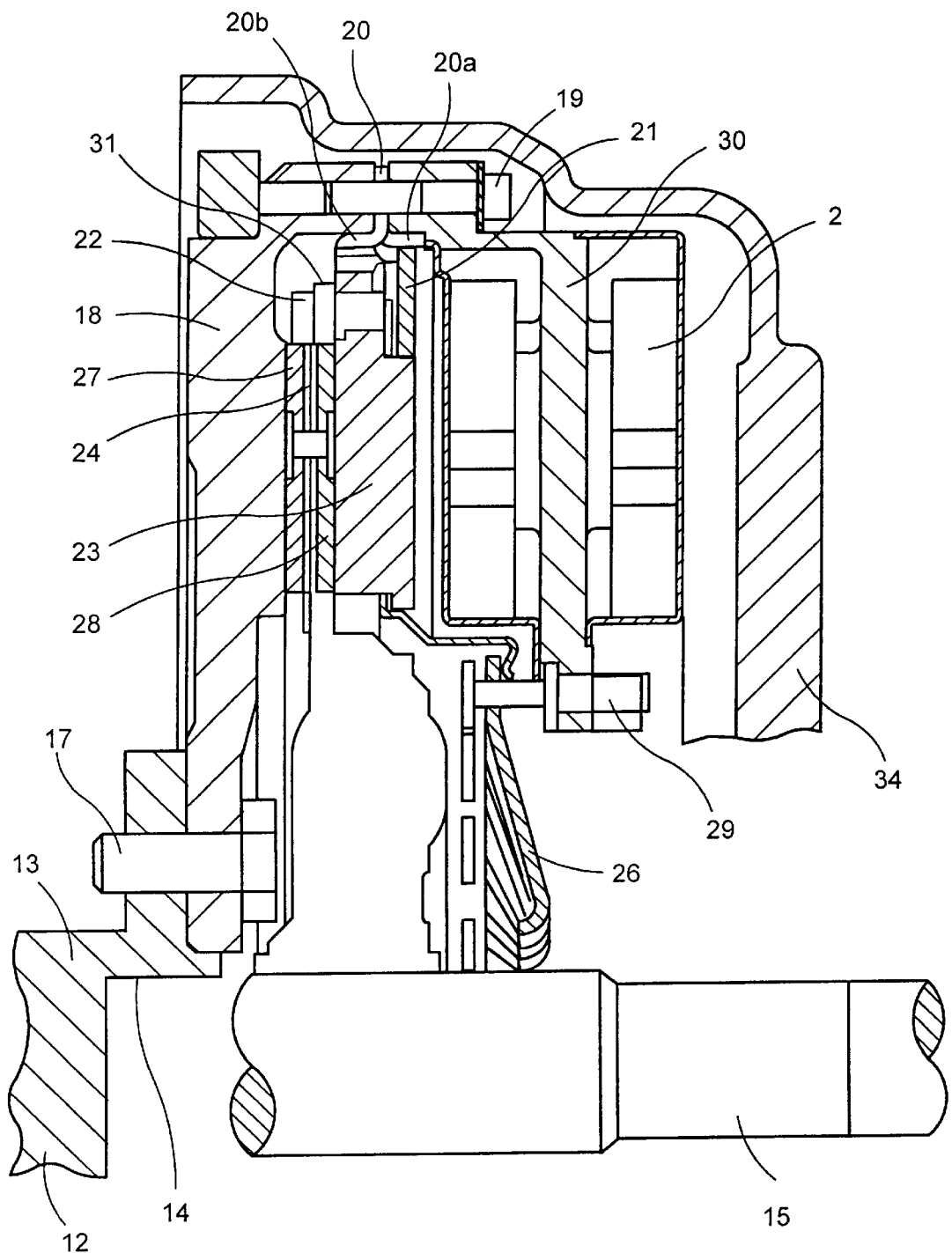
FIG. 1 is a cross-section of a clutch having a damper and a clutch cover as a centering aid.

In FIG. 1, a damper 2 is depicted having a rotatably-fixed connection to a crankshaft 12 of a periodically-activated prime mover or a driven machine. The crankshaft 12 is provided at its end 13 with a central bore hole 14, in which a clutch shaft 15 is rotatably mounted. Furthermore, end 13 has a connection 17, in the form of a bolt, to a flywheel 18. Flywheel 18 extends in the shape of a disk out from the axis of rotation of crankshaft 12.

Arranged on the gear unit side of flywheel 18 is a clutch, composed of elements 20 through 30. The clutch has a clutch cover 20, which, at the outer periphery, is connected by a connector 19, in the form of a bolt, to flywheel 18 so as to be rotatably fixed to flywheel 18. Bolts 22 and strips 31, which strips 31 are flexible in a direction perpendicular to their length, but which do not expand in a lengthwise direction, are connected to clutch cover 20. The bolts 22 and strips 31 radially support an axially-displaceable pressure plate 23 and transmit torque to pressure plate 23.

Located between pressure plate 23 and flywheel 18 is a clutch plate 24, which is connected to clutch shaft 15. A pressure mechanism made of a spring part 21 and a lever part 26 acts to control pressing of pressure plate 23 against clutch plate 24, upon actuation of the clutch. The clutch plate 24 is provided on both sides with friction linings 27, 28. Lever part 26 is depicted in FIG. 1 in a position where it removes pressure from clutch plate 24 against the action of spring-deflected spring part 21. A support 29 guides the lever part 26, which acts in conjunction with spring part 21 to control the engagement or disengagement of pressure plate 23 with clutch plate 24. Pushing in the inner end of lever part 26 causes the lever part 26 to pivot about support 29, thereby pulling back pressure plate 23 against the force of spring part 21, resulting in disengagement of the clutch. Conversely, releasing the inner end of lever part 26 causes the lever part 26 to pivot about support 29, thereby causing the force of spring part 21 to push pressure plate 23 against clutch plate 24, resulting in engagement of the clutch. Therefore, lever part 26 acts as the force-originating part of an undepicted pressure mechanism of a mechanical or hydraulic type.

In the gear unit-side outer area of flywheel 18, damper hub 30 is connected in a rotatably fixed manner to flywheel 18 by connector 19, in the form of a bolt. The damper has any known design, for example, it may be frictional, dynamic or electromagnetic. Damper hub 30, however, is connected not on its inner circumference to the shaft 15, but in the present invention is connected on its outer circumference to flywheel 18.

The support 29 of lever part 26 is situated at the inner circumference of hub 30. This support 29 absorbs the reacting forces which arise in response to the actuation of the clutch, and transfers them to hub 30, which is fixedly connected to flywheel 18. Hub 30 is dimensioned such that the forces from support 29 can be absorbed without difficulty. This is in contrast to conventional clutches, in which the clutch cover transmits the rotary motion to a pressure plate via bolts and, in addition, forms the support for a cup spring. In these known clutches, the clutch cover must therefore be designed in a correspondingly sturdy manner.

Also diverging from conventional clutches, spring part 21 is arranged in the area of the outer periphery of pressure plate 23 as a component part designed separately from lever part 26. Spring part 21 is supported against damper hub 30, at a radially outer end, and pressure plate 23, at a radially inner end. Pressure plate 23 can be displaced longitudinally by support 29 and lever part 26. In the example of FIG. 1, the spring part 21 is a cup spring and is depicted in its spring-deflected (i.e., flattened) state. Torque is transferred via clutch cover 20. Starting from the shape of a disk ring, clutch cover 20 has bent areas 20a, 20b, which function to center damper hub 30 on flywheel 18.

Both the clutch as well as damper 2 are surrounded by a clutch bell housing 34.

Because lever part 26 is supported on damper hub 30, the axial overall length and the mass are reduced. Clutch cover 20 has only a torque-transferring function and no support function for the cup spring spring part 21. Therefore, in comparison with conventional designs, a considerably weaker construction of clutch cover 20 will suffice, since both the forces acting on the support 29 as well as the flexural torque are shifted to damper hub 30.

In FIG. 2, a clutch is depicted which needs no clutch cover. Damper 2, having damper hub 30, is connected to pressure plate 23 by torque-transferring strips 31. The mounting bolts 32 of pressure plate 23 have an offset angle in the circumferential direction with respect to mounting bolts 33 of damper 2. To clarify that connection, the illustration is simplified, in comparison to FIG. 1, so that a cross-section is shown through mounting bolts 32 and 33, although those bolts are not radially aligned. The fixing strips are attached, on one end, to flywheel 18 and, on the other end, to pressure plate 23, the clutch cover can be dispensed with, as shown in the embodiment of FIG. 2. Bolts 32 in FIG. 2, similar to bolts 22 in FIG. 1, are also provided for radially supporting pressure plate 23 and for transferring the torque. The axial mobility of pressure plate 23 is produced by flexurally soft strips 31.

As in FIG. 1, in FIG. 2, damper 2 is connected to flywheel 18 by bolts 19 (not shown in FIG. 2, shown in FIG. 1). The centering is carried out by known, undepicted alignment pins.

The use of the crankshaft with damper of the present invention yields new possibilities for adjusting the torsion spring with regard to determining the optimal spring constant and damping, respectively, since the torsion spring is substantially relieved of the heretofore undamped torsional vibrations.

The present invention contemplates a number of different variations on the above-described preferred embodiment. It is to be understood that the above description is only of one preferred embodiment, and the scope of the invention is to be measured by the claims below.

What is claimed is:

1. A clutch comprising:

a damper;

a flywheel, the damper being mounted on the flywheel;

a clutch plate and a pressure plate arranged axially between the flywheel and the damper, wherein the pressure plate is rotatable fixedly connected to the flywheel;

the damper including, in an area of its inner circumference, a support;

a clutch-actuation device mounted on the support, the clutch-actuation device including a lever part and a spring part.

2. The clutch of claim 1, wherein:

the lever part and the support are arranged adjacent an axis of rotation of the clutch and the spring part is arranged in an area of an outer circumference of the pressure plate.

3. The clutch of claim 1, further comprising:

a clutch cover arranged between the flywheel and the damper.

4. The clutch of claim 3, wherein:

the clutch cover includes protuberances, the protuberances acting as centering aids for the damper.

5. The clutch of claim 3, wherein:

the clutch cover includes protuberances, the protuberances acting as centering aids for the flywheel.

* * * * *